July 17, 1956     F. M. WILLIS     2,754,873
WHEEL ATTACHMENT
Filed Jan. 8, 1954
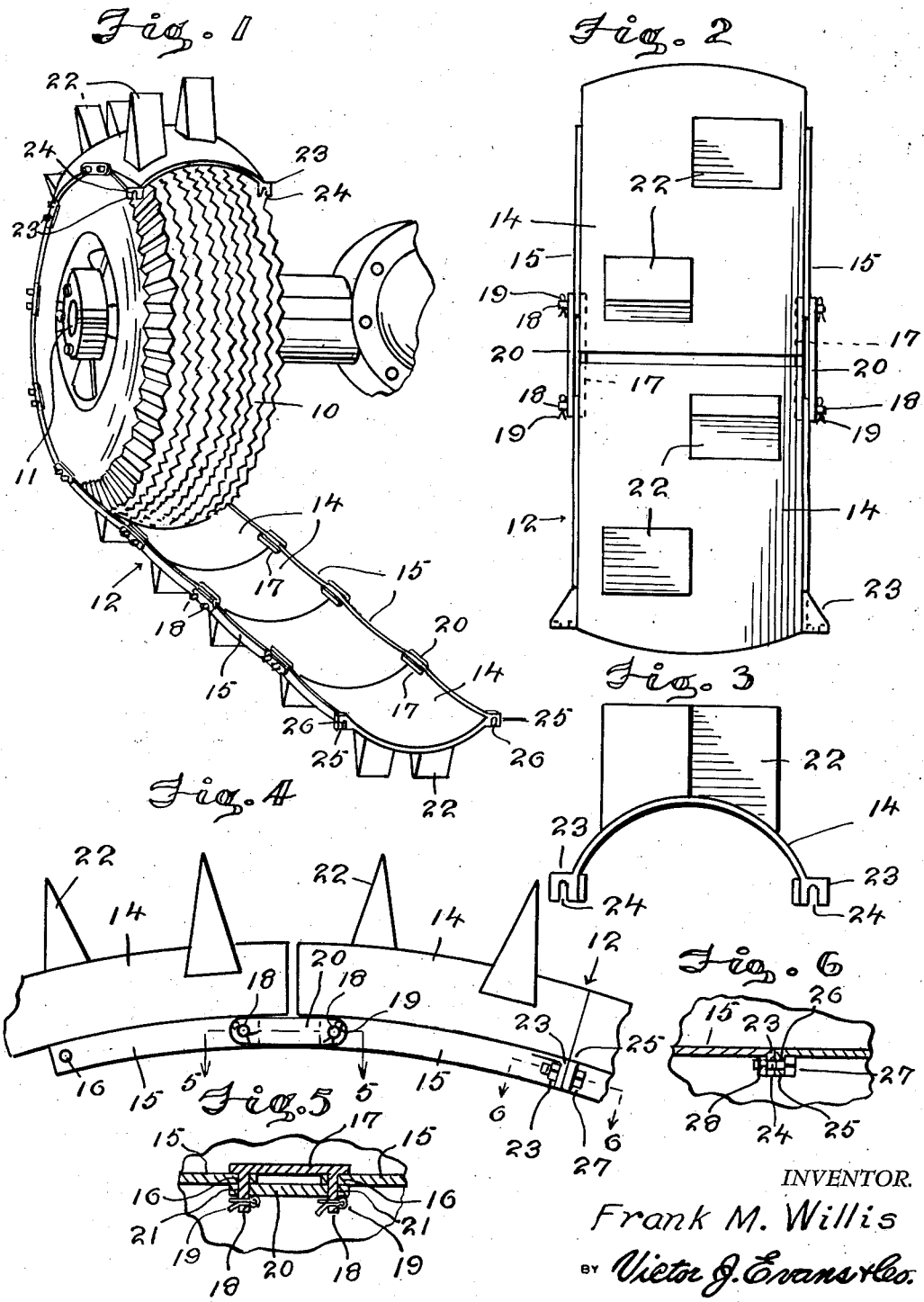
INVENTOR.
Frank M. Willis
BY *Victor J. Evans & Co.*
ATTORNEYS

# United States Patent Office 2,754,873
Patented July 17, 1956

2,754,873
WHEEL ATTACHMENT
Frank M. Willis, Cottage Grove, Oreg.
Application January 8, 1954, Serial No. 402,919
2 Claims. (Cl. 152—183)

This invention relates to a vehicle wheel, and more particularly to an attachment for one or more wheels of a vehicle which will increase the traction of the vehicle.

The object of the invention is to provide an assembly for attachment to a wheel of a tractor, truck, or other vehicle whereby there will be provided increased traction when traveling on soft or muddy roads, snow and the like.

Another object of the invention is to provide a traction device which includes a plurality of plates or sections pivotally connected together to form a chain-like structure that can be clamped over rubber tires to prevent slippage and loss of traction on steep hills, soft or loose fields, ice, or frozen ground.

A further object of the invention is to provide a wheel traction device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing one of the traction devices being assembled or removed from a vehicle wheel.

Figure 2 is a plan view of the traction device.

Figure 3 is an end elevational view of one of the plates.

Figure 4 is a fragmentary side elevational view of the traction device.

Figure 5 is a sectional view taken on the line 5—5 of Figure 4.

Figure 6 is a sectional view taken on the line 6—6 of Figure 4.

Referring in detail to the drawings, the numeral 10 designates a wheel of a conventional vehicle which may be mounted on an axle 11, Figure 1, and the numeral 12 designates in its entirety the traction device for attachment to the wheel 10.

The traction device 12 includes a plurality of curved sections or plates 14 which are arranged in end to end relation with respect to each other and which are pivotally connected together. Each of the curved plates 14 is adapted to snugly embrace the periphery of the tire 10 so as to conform thereto, and each of the plates 14 is provided with a pair of angularly arranged flanges 15 on its side edge. The flanges 15 are each provided with a pair of apertures or openings 16 for a purpose to be later described.

For pivotally connecting the adjacent plates 14 together, there is provided brackets 17 which are each provided with a pair of spaced parallel prongs or pins 18. The pins 18 extend through the openings 16 in the flanges 15 and also through apertures or openings 21 in links 20. Suitable securing elements such as cotter keys 19 extend through the pins 18 for maintaining the parts connected together. It will be seen that the bracket 17 is arranged on the opposite side of the flanges 15 from the links 20, Figure 5.

Extending outwardly from each of the plates 14 and secured thereto in any suitable manner, as for example by welding, is a plurality of triangular shaped spade-like lugs 22. The lugs 22 are arranged in rows or in staggered relation with respect to each other, Figures 2 and 3, and the lugs 22 have their outer ends pointed for increasing the traction of the device.

For attaching the meeting ends of the plates together, one of the plates 14 is provided with a pair of ears 23 which each has a slot 24 therein, Figure 1. The adjacent plate 14 is provided with a pair of body members 25 which is each provided with an opening 26, and suitable securing elements such as bolts 27 extend through the registering slots 24 and openings 25. A nut 28 is arranged in threaded engagement with each of the bolts 27 for maintaining the parts in their assembled relation.

From the foregoing it is apparent that a traction device has been provided which can be readily attached to or removed from a vehicle wheel or tire such as the tire 10. The plates 14 are hingedly connected together by means of the links 20 and brackets 17 as shown in Figure 5, and the free ends of the traction device are interconnected together by the bolts 27 and nuts 28, Figure 6. Projecting outwardly from each of the plates and secured thereto is a plurality of pointed lugs 22 which are adapted to engage the ground so as to provide increased traction for the vehicle.

With the present invention skidding of the vehicle will be minimized and since the device is formed of a plurality of separable units, any one of the plates or other parts which become damaged can be readily removed and replaced with a minimum of expense and labor. The present invention is especially suitable for rubber tired tractors and the parts can be made of any suitable material such as metal. The present invention prevents slippage and loss of traction on steep hills, soft or loose fields or when there is ice or frozen ground. Also, the present invention can be used on farm trucks, tractors, jeeps and other vehicles of all sizes and shapes. The plates are shaped to fit the tire and extend along the side walls far enough to keep them in place. The present invention will give better traction than chains and are ruggedly constructed so that they will not be readily damaged. Also, there will be prevented wear and tear on the tires and when plowing the furrow wheel when equipped with the present invention will do a good job of sub-soiling since it will cut down into and break up the "hard pan" to permit the moisture to pass through. When the device is not being used if it is a small size it can be rolled up for shipment or storage to occupy a minimum amount of space and the traction assemblies can be readily removed from the tire by loosening the bolt and nut assemblies 27 and 28.

I claim:

1. In a traction device, a plurality of curved plates arranged in end to end relation with respect to each other, a flange extending from each side of each of said plates, said flanges each being provided with a pair of openings, a pair of brackets pivotally connecting adjacent plates together and each including a pair of pins extending through the openings in said flanges, a link arranged exteriorly of said flanges and provided with a pair of apertures for receiving said pins, securing elements for maintaining said parts connected together, and a plurality of spade lugs secured to the outer surface of said plates, said lugs each having their outer ends pointed and said lugs being arranged in staggered relation with respect to each other, and means connecting the free ends of said plates together, said means comprising a pair of ears secured to one of said plates and each provided with a slot, and a pair of body members secured to another of said plates and provided with openings for registering with said slots, and securing elements extending through said registering slots and openings.

2. A traction device comprising a plurality of curved plates of the same size arranged in end to end relation with respect to each other, a flange extending from each side of each of said plates, the pair of flanges on each plate being arranged in spaced parallel relation with respect to each other, said flanges each being provided with a pair of openings adjacent their ends, a pair of brackets pivotally connecting the adjacent plates together and each including a pair of pins extending through the openings in said flanges, said brackets being arranged contiguous to the inner surface of said flanges, a link arranged exteriorly of said flanges and provided with a pair of apertures adjacent its ends for receiving said pins, securing elements for maintaining said parts connected together, and a plurality of spade lugs secured to the outer surface of said plates, said lugs each having their outer ends pointed and said lugs being arranged in staggered relation with respect to each other, and means connecting the free ends of said plates together, said means comprising a pair of ears secured to one of said plates adjacent the ends thereof and each of said ears being provided with an open ended slot, a pair of body members secured to another of said plates and provided with openings for registering with said slots, and securing elements extending through said registering slots and openings.

References Cited in the file of this patent

UNITED STATES PATENTS

| | | |
|---|---|---|
| 1,245,232 | Hoskins | Nov. 6, 1917 |
| 2,671,489 | Henderson | Mar. 9, 1954 |

FOREIGN PATENTS

| | | |
|---|---|---|
| 365,941 | France | May 5, 1906 |